(12) United States Patent
Lo et al.

(10) Patent No.: US 11,205,432 B2
(45) Date of Patent: Dec. 21, 2021

(54) CROSS-PLATFORM COMMUNICATION METHOD, SERVER DEVICE AND ELECTRONIC DEVICE

(71) Applicant: Wistron Corporation, New Taipei (TW)

(72) Inventors: Chih-Peng Lo, New Taipei (TW); Shu-Hui Yeh, New Taipei (TW)

(73) Assignee: Wistron Corporation, New Taipei (TW)

( * ) Notice: Subject to any disclaimer, the term of this patent is extended or adjusted under 35 U.S.C. 154(b) by 186 days.

(21) Appl. No.: 16/676,461

(22) Filed: Nov. 7, 2019

(65) Prior Publication Data

US 2021/0050009 A1   Feb. 18, 2021

(30) Foreign Application Priority Data

Aug. 14, 2019   (TW) .................................. 108128872

(51) Int. Cl.

| | |
|---|---|
| *G10L 15/00* | (2013.01) |
| *G10L 15/22* | (2006.01) |
| *G10L 15/26* | (2006.01) |
| *G06F 3/16* | (2006.01) |
| *H04L 12/58* | (2006.01) |
| *G06F 16/33* | (2019.01) |
| *H04W 4/12* | (2009.01) |
| *G06F 40/30* | (2020.01) |

(52) U.S. Cl.
CPC .............. *G10L 15/22* (2013.01); *G06F 3/167* (2013.01); *G06F 16/3344* (2019.01); *G06F 40/30* (2020.01); *G10L 15/26* (2013.01); *H04L 51/02* (2013.01); *H04L 51/28* (2013.01); *H04L 51/36* (2013.01); *H04W 4/12* (2013.01)

(58) Field of Classification Search
CPC ......... H04L 51/04; H04L 65/00; G10L 15/22; G06F 9/542
See application file for complete search history.

(56) References Cited

U.S. PATENT DOCUMENTS 9,736,294 B2 *   8/2017   Kiukkonen ....... H04W 52/0277
2013/0061274 A1 *   3/2013   Kim .................... H04N 21/2396
725/93

(Continued)

FOREIGN PATENT DOCUMENTS

TW           200924459           6/2009

OTHER PUBLICATIONS

"Office Action of Taiwan Counterpart Application", dated May 19, 2020, p. 1-p. 14.

*Primary Examiner* — Daniel Abebe
(74) *Attorney, Agent, or Firm* — JCIPRNET

(57) ABSTRACT

A cross-platform communication method, a server device and an electronic device are provided. A user message from a first electronic device is received via a first service providing platform. A user intent of the user message and a keyword associated with at least one second electronic device are recognized. The contact information of the second electronic device is queried according to the keyword. A response message related to the user message is transmitted to the second electronic device via a second service providing platform according to the contact information and the user intent, such that the second electronic device performs a function according to the response message.

18 Claims, 11 Drawing Sheets

(56) References Cited

U.S. PATENT DOCUMENTS

| | | | |
|---|---|---|---|
| 2014/0298353 A1* | 10/2014 | Hsu | G06F 9/54 |
| | | | 719/313 |
| 2018/0095734 A1* | 4/2018 | Boyd | G06F 3/0481 |
| 2018/0182380 A1* | 6/2018 | Fritz | G10L 15/22 |
| 2019/0235692 A1* | 8/2019 | Sarnoff | G09G 5/006 |
| 2020/0349940 A1* | 11/2020 | Ko | G10L 15/26 |
| 2020/0374251 A1* | 11/2020 | Warshaw | H04L 51/12 |

* cited by examiner

CROSS-PLATFORM COMMUNICATION METHOD, SERVER DEVICE AND ELECTRONIC DEVICE

CROSS-REFERENCE TO RELATED APPLICATION

This application claims the priority benefit of Taiwan application serial no. 108128872, filed on Aug. 14, 2019. The entirety of the above-mentioned patent application is hereby incorporated by reference herein and made a part of this specification.

BACKGROUND

1. Technique Field

The disclosure relates to a communication method, in particular to a cross-platform communication method, server device and an electronic device.

2. Description of Related Art

In the developed network times, various types of instant communication software are one of the most important communication tools at present, and are being used more and more frequently and have a tendency to gradually replace traditional telephones. The types of the instant communication software are varied, and the instant communication software habitually used by everyone is not necessarily the same. Therefore, two users need to confirm in advance whether the instant communication software used by each other is the same, and then can communicate with each other with the same instant communication software. In the case that the two users use different instant communication software, an electronic device of one of the users needs to be installed with an extra instant communication software that is unfamiliar to the user, and the user not only needs to conduct complicated registration, but also needs to re-adapt to the software that has not been used. That is, the users often need to install a variety of instant communication software to cope with the actual communication requirements, which brings considerable trouble and inconvenience in use to the users.

SUMMARY

In view of this, the disclosure provides a cross-platform communication method, server device and an electronic device, which enable two electronic devices to perform cross-platform communication through different service providing platforms, so as to provide a more flexible and convenient communication mode.

The embodiment of the disclosure provides a cross-platform communication method, applicable to a communication system and including the following steps: receiving a user message from a first electronic device through a first service providing platform; identifying a user intent and a keyword associated with at least one second electronic device of the user message; inquiring contact information of the second electronic device according to the keyword; and sending a response message associated with the user message to the second electronic device according to the contact information and the user intent through a second service providing platform, so as to enable the second electronic device to perform a function according to the response message.

The embodiment of the disclosure provides a server device, including a communication interface, a storage circuit and a processor. The communication interface is connected to a first service providing platform and at least one second service providing platform via a network, and the storage circuit records a plurality of modules.

The processor is configured to receive a user message from a first electronic device from the first service providing platform, and identify a user intent of the user message and a keyword associated with at least one second electronic device. The processor is configured to inquire contact information of the second electronic device according to the keyword, and send a response message associated with the user message to the second electronic device according to the contact information through the second service providing platform, so as to enable the second electronic device to perform a function according to the response message.

The embodiment of the disclosure provides an electronic device, including a processor and a memory. The processor is configured to: access a contact list of a user and a communication channel list of the user; provide the contact list of the user and the communication channel list of the user to a server device; and send a user message through a chatting interface of a first service providing platform or receive a response message through a chatting interface of a second service providing platform, wherein each chatting interface includes a chatbot operated by the server device.

Based on the above, in the embodiments of the disclosure, the server device may receive the user message from the first electronic device via the first service providing platform through an application of the first service providing platform. The server device may identify the user intent of the user message and acquire the contact information of the second electronic device. The server device may send the user message to the second electronic device via the second service providing platform based on the contact information of the second electronic device. Therefore, the first electronic device and the second electronic device may perform cross-platform communication via different service providing platforms, so as to provide a more convenient communication mode to the user.

In order to make the aforementioned and other objectives and advantages of the disclosure comprehensible, embodiments accompanied with figures are described in detail below.

DESCRIPTION OF THE EMBODIMENTS

Some embodiments of the disclosure will be described in detail below with reference to the accompanying drawings. For reference symbols used in the following descriptions, same reference symbols in different drawings represent same or similar components. These embodiments are merely a part of the present disclosure, and do not disclose all possible implementations of the disclosure. More specifically, these embodiments are merely examples of a method, a system, and an apparatus in the claims of the disclosure.

Figure 1:
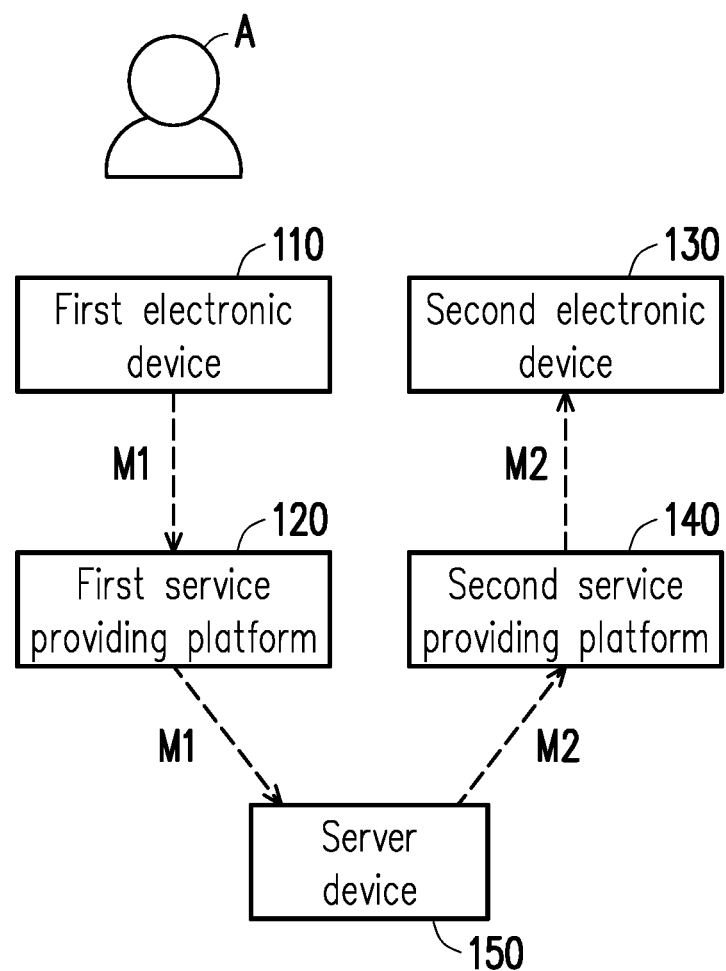
FIG. 1 is a schematic diagram of a cross-platform communication system illustrated according to an embodiment of the disclosure.

FIG. 1 is a schematic diagram of a cross-platform communication system illustrated according to an embodiment of the disclosure. Referring to FIG. 1, the cross-platform communication system 10 includes a first electronic device 110, a first service providing platform 120, a second electronic device 130, a second service providing platform 140, and a server device 150.

The first electronic device 110 receives a user message M1 issued by a user A. The first electronic device 110 is, for example, a smart phone, a tablet computer, a notebook computer, a smart watch, a smart speaker, an Internet of Things device, a vehicle-mounted electronic device, or other types of networking devices, and the disclosure is not limited thereto. In addition, the first electronic device 110 is provided with an application such as a smart assistant program or an instant communication program, so as to be connected to various service providing platforms through the application to acquire corresponding services. The user A can issue the user message M1 to the first electronic device 110 via a voice input interface or a text input interface.

The first service providing platform 120 can be implemented by various types of computer devices and software elements operated in the computer devices. The first electronic device 110 may be connected to the first service providing platform 120 via a wired network or a wireless network, so as to acquire a service provided by the first service providing platform 120. For example, assuming that the first service providing platform 120 is an instant communication platform, the first electronic device 110 may communicate with other electronic devices via the first service providing platform 120 by using the instant communication program. The instant communication program is, for example, Line, Fb message, WeChat, Skype, WhatsApp, etc. Assuming that the first service providing platform 120 is a voice assistant platform, and then the first electronic device 110 may identify an intent of the user and perform a corresponding operation through the first service providing platform 120 by using the smart assistant program. The smart assistant program is, for example, Microsoft Cortana, Google Assistant, Amazon Alexa, etc.

The second electronic device 130 receives a response message M2 associated with the user message M1 and performs a function according to the response message M2. The second electronic device 130 is, for example, a smart phone, a tablet computer, a notebook computer, a smart watch, a smart speaker, a vehicle-mounted electronic device, an Internet of Things device, or other types of networking devices, and the disclosure is not limited thereto. For example, when the response message M2 is an instant communication message, the second electronic device 130 may provide the response message M2 to a target user through the instant communication program. When the response message M2 is a control command of the Internet of Things device, the second electronic device 130 may perform an action corresponding to the control command according to the response message M2, such as turning on a power supply or turning off the power supply.

The second service providing platform 140 may be implemented by various types of computer devices and the software elements operated in the computer devices. The second electronic device 130 may be connected to the second service providing platform 140 via a wired network or a wireless network, so as to acquire a service provided by the second service providing platform 140. For example, assuming that the second service providing platform 140 is an instant communication platform, the second electronic device 130 may communicate with other electronic devices via the second service providing platform 140 by using the instant communication program. Assuming that the second service providing platform 140 is an Internet of Things platform, the second electronic device 130 may acquire the control command via an Internet of Things gateway in the second service providing platform 140. Assuming that the second service providing platform 140 is a voice assistant platform, the second electronic device 130 may play the response message M2 through the second service providing platform 140.

In one embodiment, the first service providing platform 120 and the second service providing platform 140 are different instant communication platforms. In one embodiment, the first service providing platform 120 is the voice assistant platform, and the second service providing platform 140 is the instant communication platform. In one embodiment, one of the first service providing platform 120 and the second service providing platform 140 is provided by the server device 150, and the other one of the first service providing platform 120 and the second service providing platform 140 is the instant communication platform. In one embodiment, the first service providing platform 120 and the second service providing platform 140 are different service providing platforms.

The server device 150 may serve as a communication bridge between the first service providing platform 120 and the second service providing platform 140. The server device 150 may identify the user intent of the user message M1, so as to determine the response message M2 according to the user intent and inquire the contact information of the second electronic device 130. After acquiring the contact information of the second electronic device 130, the server device 150 then sends the response message M2 to the second electronic device 130 via the second service providing platform 140 according to the contact information. In other words, the first electronic device 110 uses the application of the first service providing platform 120, and the second electronic device 130 uses the application of the second service providing platform 140. Therefore, the first electronic device 110 and the second electronic device 130 may perform cross-platform communication through the assistance of the server device 150.

It should be noted that one second electronic device 130 and one second service providing platform 140 are exemplified in the embodiment of FIG. 1 for illustration, but the embodiment of the disclosure does not limit the number of the second electronic device and the number of the second service providing platform. In other words, in one embodiment, the server device 150 may send the corresponding response message M2 to a plurality of second electronic devices via different service providing platforms in response to the received user message M1.

Figure 2A:
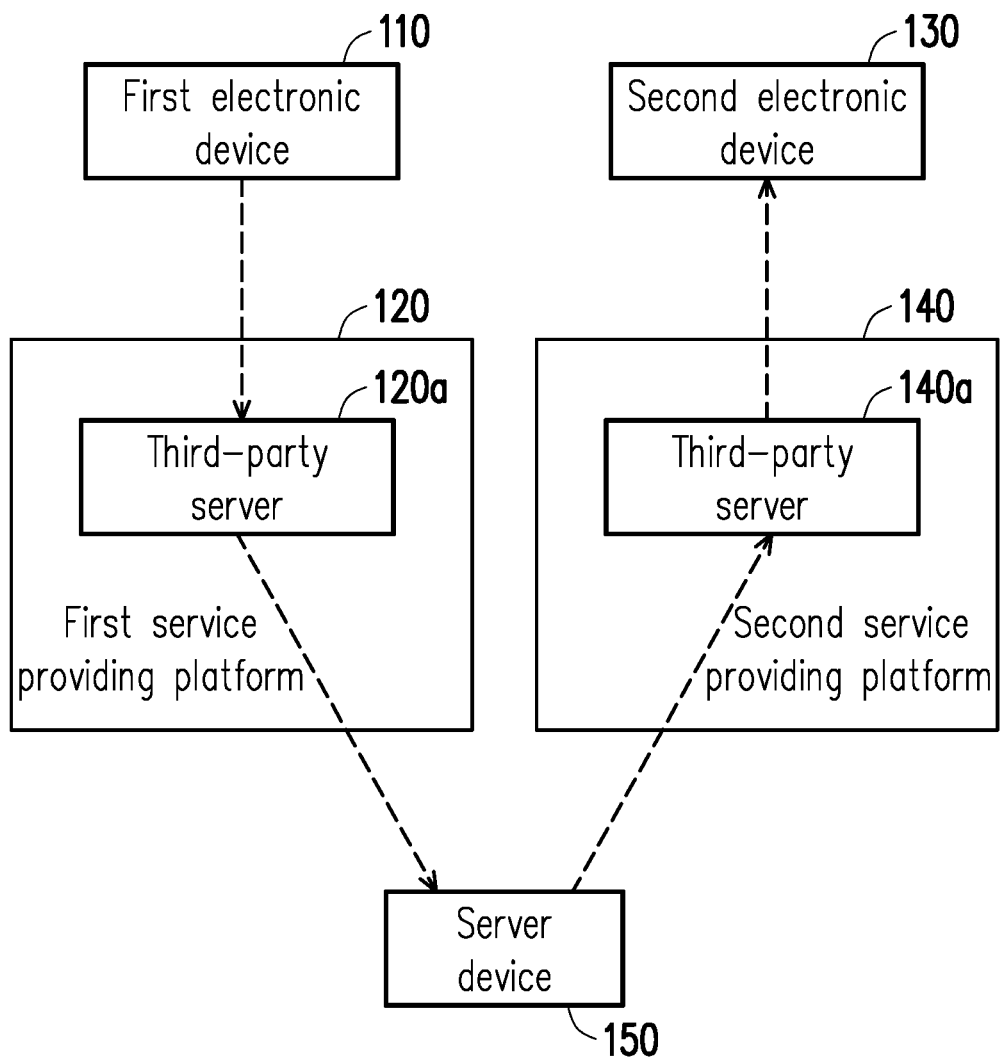
FIGS. 2A to 2C are schematic diagrams of a cross-platform communication system illustrated according to an embodiment of the disclosure.
Figure 2B:
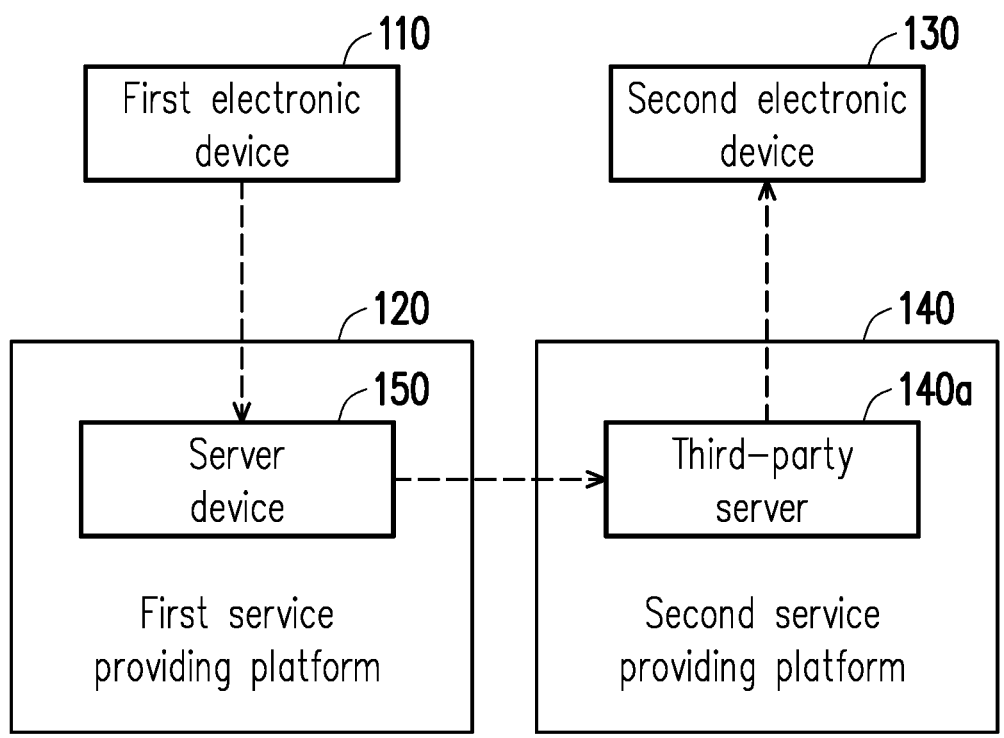
Figure 2C:
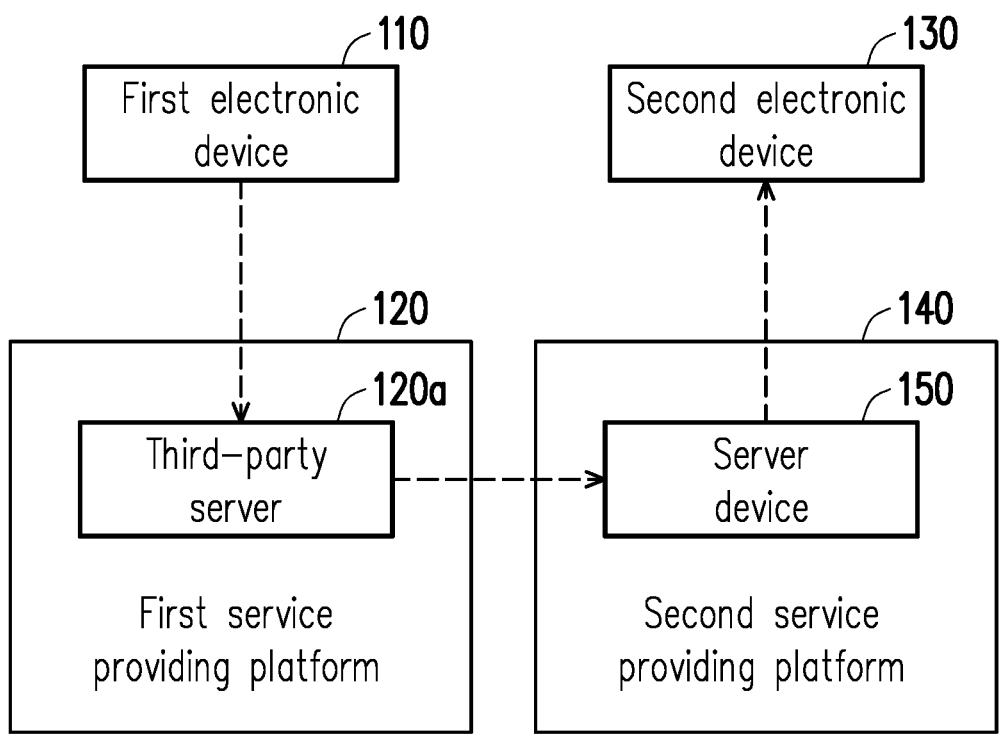

In one embodiment, referring to FIG. 2A, it is a schematic diagram of a cross-platform communication system illustrated according to an embodiment of the disclosure. The server device 150 may be connected with a third-party server 120a in the first service providing platform 120 and a third-party server 140a in the second service providing platform 140 via a network. In other words, the server device 150 may receive the user message M1 from the first electronic device 110 from the third-party server 120a corresponding to the first service providing platform 120, and the server device 150 may send the response message M2 to the second electronic device 130 through the other third-party server 140a corresponding to the second service providing platform 140. Or, in another embodiment, referring to FIGS. 2B and 2C, FIGS. 2B and 2C are schematic diagrams of a cross-platform communication system illustrated according to an embodiment of the disclosure. The server device 150 may be a service server in one of the first service providing platform 120 and the second service providing platform 140, and is connected with a third-party server 120a or 140a in the other one of the first service providing platform 120 and the second service providing platform 140 via a network. In other words, the server device 150 may directly receive the user message M1 from the first electronic device 110, and the server device 150 sends the response message M2 to the second electronic device 130 through the third-party server 140a corresponding to the second service providing platform 140. Or, the server device 150 may receive the user message M1 from the first electronic device 110 from the third-party server 120a corresponding to the first service providing platform 120, and the server device 150 directly sends the response message M2 to the second electronic device 130.

Figure 3:
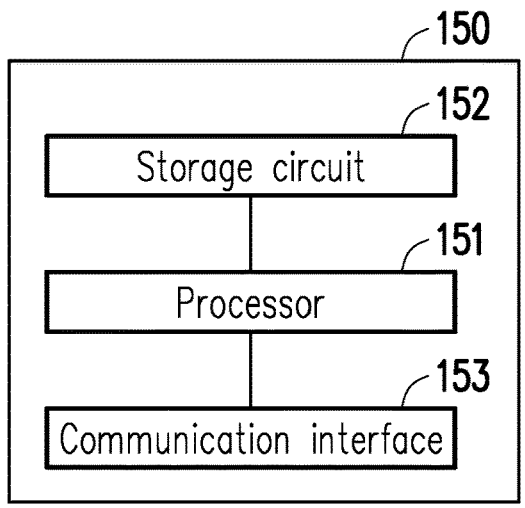
FIG. 3 is a block diagram of a server device illustrated according to an embodiment of the disclosure.

FIG. 3 is a block diagram of a server device 150 illustrated according to an embodiment of the disclosure, this is only for convenience in description, but not intended to limit the disclosure. Referring to FIG. 3, the server device 150 includes a processor 151, a storage circuit 152 and a communication interface 153.

The storage circuit 152 is configured to store data, software modules and program codes, and may be, for example, a stationary or mobile random access memory (RAM) of any type, a read-only memory (ROM), a flash memory, a hard disk or other similar devices, an integrated circuit and a combination thereof.

The processor 151 is configured to implement the provided cross-platform communication method, and may be, for example, a central processing unit (CPU), a graphics processing unit (GPU), or other programmable general purpose or special purpose microprocessors, a digital signal processor (DSP), a programmable controller, an application specific integrated circuit (ASIC), a programmable logic device (PLD) or other similar devices, wafers, integrated circuits, and combinations thereof. In the embodiment of the disclosure, the processor 151 may load a program code or module recorded in the storage circuit 152 to implement the cross-platform communication method provided by the embodiment of the disclosure.

The communication interface 153 is configured to connect with a network, and transmit data to other networked devices via the network or receive data from other networked devices via the network. The communication interface 153 is, for example, a network interface that supports Ethernet, fibernet or other network standards.

In the embodiment of the disclosure, the server device 150 may be a computer, a workstation, a cloud server with a computing function, or a combination of the above devices, and the disclosure does not limit the type of the server device 150. From another point of view, the server device 150 may also be implemented by a cloud computing platform that provides a variety of cloud services, and the cloud computing platform is, for example, Microsoft Azure, Amazon Web Services (AWS), and the like.

Figure 4:
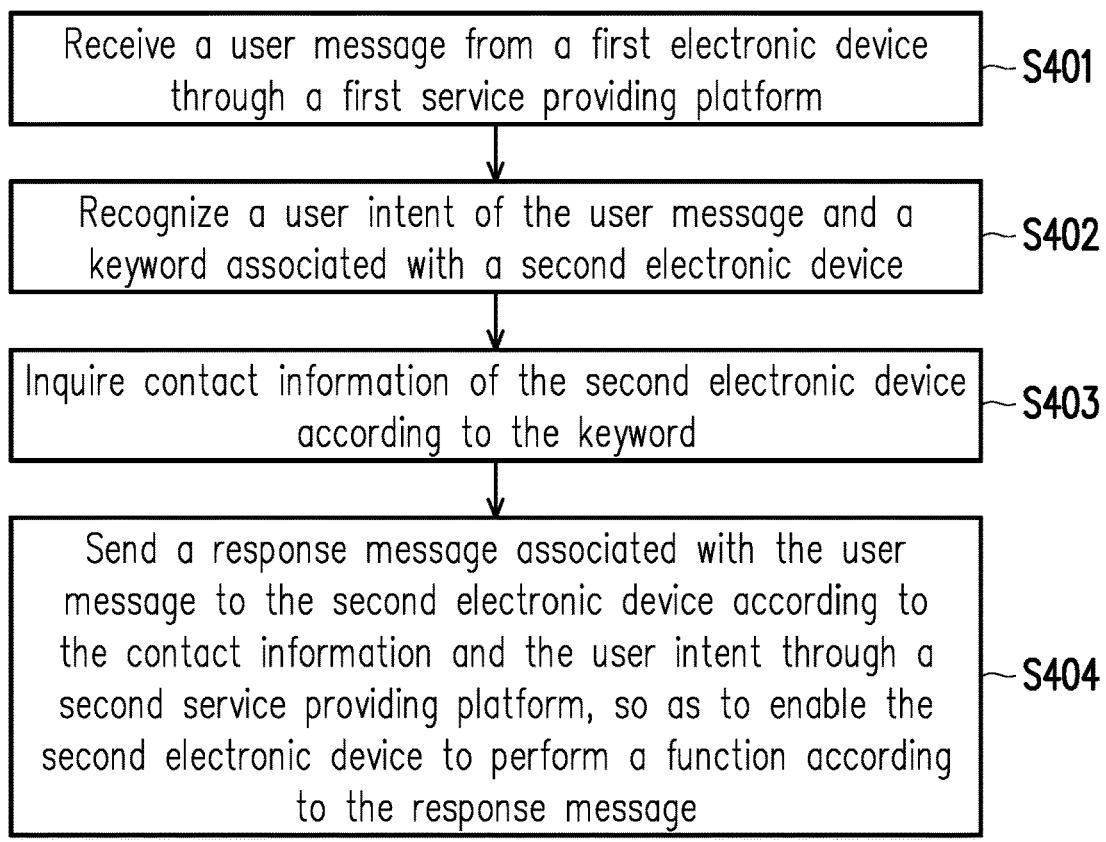
FIG. 4 is a flow chart of a cross-platform communication method illustrated according to an embodiment of the disclosure.

FIG. 4 is a flow chart of a cross-platform communication method illustrated according to an embodiment of the disclosure. Referring to FIGS. 1, 3 and 4, the mode of the present embodiment is applicable to the server devices 150 of the above embodiments. Detailed steps of the cross-platform communication method of the present embodiment will be described below in combination with all elements in the server device 150.

In Step S401, the processor 151 receives a user message M1 from a first electronic device 110 through a first service providing platform 120. Specifically, a user A may use a message input interface of the first electronic device 110 to issue the user message M1 to the first electronic device 110. The first electronic device 110 may transmit the user message M1 to the first service providing platform 120 through a network, and the server device 150 may receive the user message M1 through the first service providing platform 120.

In Step S402, the processor 151 identifies a user intent of the user message M1 and a keyword associated with a second electronic device 130. For example, the processor 151 may identify the user intent of the user message M1 by using a natural language processing technology (such as the Language Understanding Intelligent Service (LUIS) provided by the Microsoft Corporation). The aforementioned user intent is, for example, "Send a target user a message", "Control an Internet of Things device", or "Assign a task to a target user", and the like. Here, the processor 151 may also identify the keyword associated with the second electronic device 130. The keyword is, for example, a user name of a target user, a device name of an Internet of Things device, or position information of a task, and the like.

In Step S403, the processor 151 inquires contact information of the second electronic device 130 according to the keyword. Specifically, the server device 150 may inquire a database by using the keyword to acquire the contact information of the second electronic device 130. The aforementioned database may be a database in the server device 150 or a database provided by other data servers, and the disclosure is not limited thereto. It can be seen that the aforementioned database may record contact ways (such as a contact way through a specific instant communication platform) of a plurality of electronic devices, and these electronic devices are respectively associated with corresponding keywords.

In Step S404, the processor 151 sends a response message M2 associated with the user message M1 to the second electronic device 130 through a second service providing platform 140 according to the contact information and the user intent, so as to enable the second electronic device 130 to perform a function according to the response message M2. That is, the first electronic device 110 acquires the user message M1 by using an application of the first service platform 120, and the second electronic device 130 receives the response message M2 by using an application of the second service platform 140. Thereby, the first electronic device 110 using the first service providing platform may perform cross-platform communication with the second electronic device 130 using the second service providing platform through bridging of the server device 150.

The cross-platform communication method of the embodiment of the disclosure will be described below for various application situations. It should be noted that when a user wishes to use a cross-platform communication service provided by the server device 150, the user needs to firstly perform a registration process on a service providing platform of the server device 150. In the embodiment of the disclosure, the server device 150 may establish a contact list of the user and a communication channel list of the user in response to a received registration request from the user. In detail, when the registration process is performed, the server device 150 firstly sets unique information of the user (such as a phone number, an e-mail address, or a unique serial number assigned by other server devices 150) as a user account. It should be noted that, when the registration process is performed, if the user performs registration authentication through a third-party application, the server device 150 may acquire registered account data of the user in the third-party application and generate a corresponding access token. Furthermore, when the registration process is performed, the server device 150 may acquire an open support language family of the first/second electronic device, and may also acquire a reminder event list recorded in the first/second electronic device and acquire a registration time zone, a national country code and group data of an operating system of the first/second electronic device. In addition, the user needs to register an instant communication program used by the user and corresponding instant communication account information to the server device 150, so as to establish the communication channel list of the user. That is, the communication channel list includes contact information of a plurality of communication interfaces of a target user B. In other words, the communication channel list may include at least one instant communication program and corresponding instant communication account information. In addition, the server device 150 will request the user to open an access permission to a particular address book, so as to establish a contact list by accessing information in the address book. The contact list may include names of a plurality of contacts, corresponding phone numbers or e-mail addresses, and the like. It can be seen that after the user performs the registration process on the service providing platform of the server device 150, the server device 150 stores the contact list and the communication channel list of the user in a database.

In other words, from another point of view, in one embodiment, the electronic device (exemplified by the first electronic device 110 below) may include a processor and a memory. The processor of the first electronic device 110 executes a software element in the memory, and is configured to perform the following steps. In response to sending a registration request of a user to the server device 150, the first electronic device 110 accesses the contact list (such as the address book) of the user and the communication channel list (such as an application list) of the user. Then, the first electronic device 110 provides the contact list of the user and the communication channel list of the user to the server device 150. Next, a user message is sent in a chatting interface (e.g. chat room) established on the first service providing platform 120, and the chatting interface includes a chatbot operated by the server device 150. In addition, in response to sending a registration request of a user to the server device 150, the first electronic device 110 may provide user information including a registration time zone and the open support language family of the operating system of the first electronic device 110 to the server device 150.

Figure 5A:
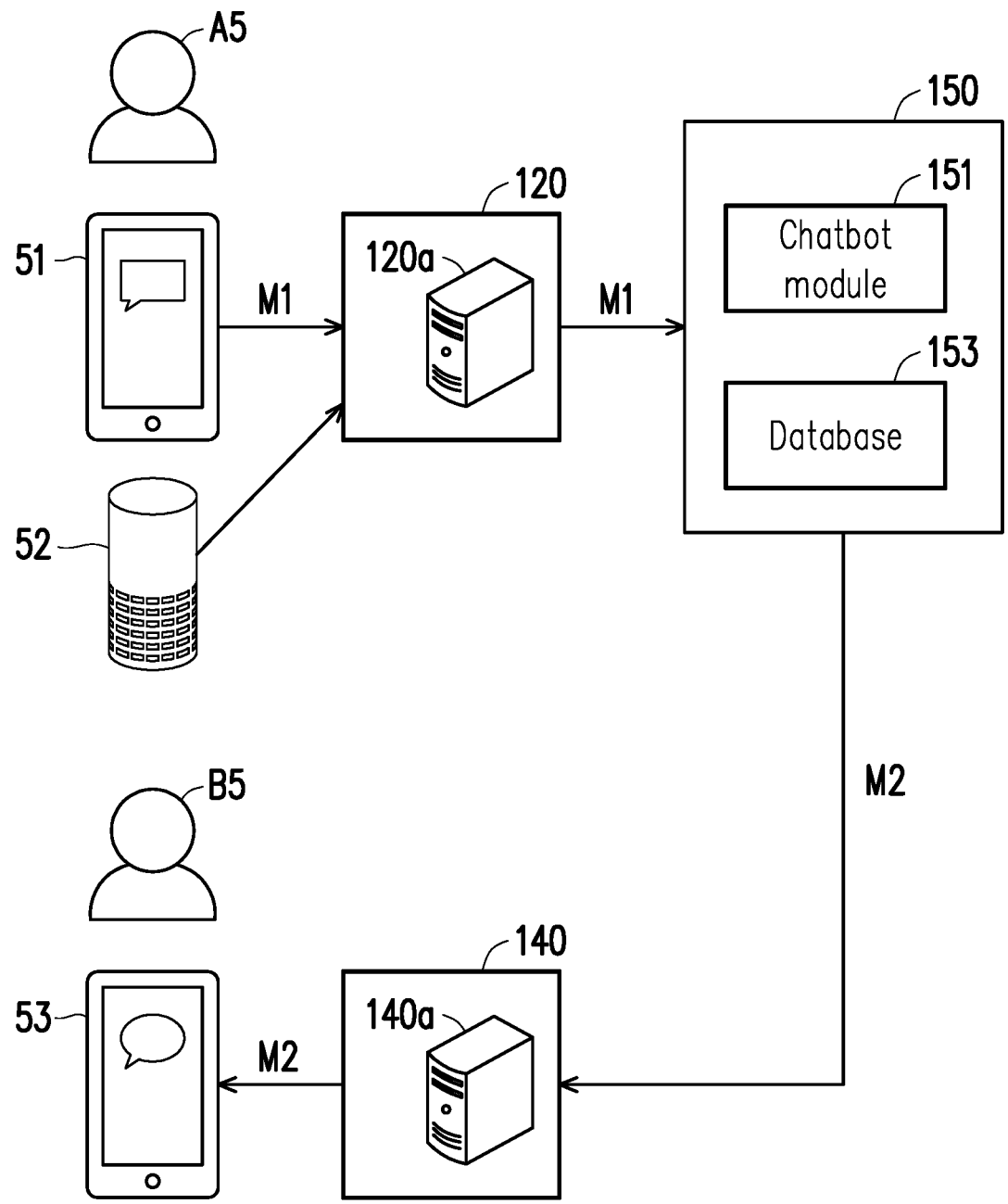
FIGS. 5A to 5C are schematic diagrams of a cross-platform communication service illustrated according to an embodiment of the disclosure.

Referring to FIG. 5A, which is a schematic diagram of a cross-platform communication service illustrated according to an embodiment of the disclosure. When the first service providing platform 120 and the second service providing platform 140 are different instant communication platforms, a user A5 using a first type of instant communication program may communicate with a user B5 using a second type of instant communication program. In order to realize cross-instant communication platform communication, a chatbot module 151 of the server device 150 establishes chatbots for different instant communication platforms. In detail, the user A5 may add a chatbot provided by the server device 150 into a friends list of the first type of instant communication program, so as to establish a chatting interface between the user A5 and the chatbot. Similarly, the user B5 may add a chatbot provided by the server device 150 into a friends list of the second type of instant communication program, so as to establish a chatting interface between the user B5 and the chatbot.

When the user A5 intends to transmit a message to the user B, the user A5 may input the user message M1 into the chatting interface with the chatbot. The user message M1 is, for example, "Send John a message with: See you at six tonight". Since the user A5 issues the user message by using the first type of instant communication program, the user message M1 is firstly transmitted to the third-party server 120a of the first service providing platform 120. Then, the first service providing platform 120 transmits the user message M1 to the chatbot, namely the server device 150. The server device 150 identifies the user intent of the user message M1 by the natural language processing technology to know that the user intent is "Send a target user a message", and acquires the keyword "John".

Next, the server device 150 inquires the contact list of the user A5 according to the keyword "John", so as to acquire a target user account of the target user B5. In other words, the server device 150 inquires the database 153 according to the keyword "John" and acquires the target user account of the target user B5. Here, the target user account of the target user B5 may be the phone number or the e-mail address and the like of the target user B5. Assuming that the user account is the phone number, and the contact list of the user A5 is as shown in Table 1.

TABLE 1

| Name of contact | User account |
| --- | --- |
| Brook | 4444-XXXXXX |
| Debbie | 3333-XXXXXX |
| Duke | 2222-XXXXXX |
| John | 1111-XXXXXX |

According to the examples of Table 1, the server device 150 may acquire the target user account "1111-XXXXXX" of the target user B5 through the keyword "John".

Assuming that the target user B5 has been registered to the service providing platform of the server device 150, the server device 150 may inquire the communication channel list of the target user B5 by using the target user account, so as to acquire the second service providing platform 140 and the contact information of the target user B5 on the second service providing platform 140. The contact information of the target user B5 on the second service providing platform 140 may be an instant communication account obtained by the registration of the target user B5 to the second service providing platform 140. For example, the communication channel list of the target user B5 may be as shown in Table 2.

TABLE 2

| Available communication interface | Contact information |
|---|---|
| Line | Line account |
| WeChat | WeChat account |

According to the examples of Table 2, the server device 150 may acquire the communication channel list as shown in Table 2 according to the target user account "1111-XXXXXX" of the target user B5, and accordingly know that the communication with the target user B5 can be realized through the second service providing platform 140 (e.g., the Line platform or the WeChat platform).

Based on this, the server device 150 may firstly transmit the response message M2 associated with the user message M1 to the third-party server 140a of the second service providing platform 140 through the chatbot established for the second service providing platform 140, and a second electronic device 53 will also receive the response message M2 from the second service providing platform 140. The second electronic device 53 provides the response message M2 to the target user B5 by a user interface of the second service providing platform 140. Here, the target user B5 may read the response message "See you at six tonight" from the chatting interface with the chatbot by using the second type of instant communication program. In addition, a text message used as the response message is exemplified in FIG. 5, but the disclosure is not limited thereto. The response message may include a text message, a picture message, a voice message or a video message. It can be thus seen that the user A5 and the target user B5 using different instant communication programs may perform cross-platform communication.

It should be noted that in one embodiment of the disclosure, assuming that the target user B5 has not been registered to the service providing platform of the server device 150, the server device 150 will be unable to inquire the communication channel list of the target user B5. Correspondingly, in response to the absence of the communication channel list of the target user account, the server device 150 may transmit the response message to the second electronic device 53 by a short message or an e-mail via the target user account.

In another aspect, the first service providing platform 120 is the voice assistant platform, and the second service providing platform 140 is the instant communication platform. In this case, a first electronic device 52 may be a smart speaker. The user A5 may issue the user message M1 to the first electronic device 52 through voice inputting, and the first electronic device 52 may send the user message M1 to the first service providing platform 120 for voice identification. The first service providing platform 120 then transmits the user message M1 subjected to voice identification to the server device 150, and the user message M1 also gains the access authority to the database at the same time. In addition, in another embodiment, the server device 150 further determines whether the user message M1 issued by the first electronic device 52 gains the access authority to the database. Then, if the user message M1 issued by the first electronic device 52 gains the access authority to the database, the server device 150 may access data in the database according to the user message M1 to perform an operation that is the same as the above, so as to send the response message M2 to the second electronic device 53 of the target user B5 through the chatbot. Therefore, the target user B5 may read the response message M2 displayed by the instant communication program.

Figure 5B:
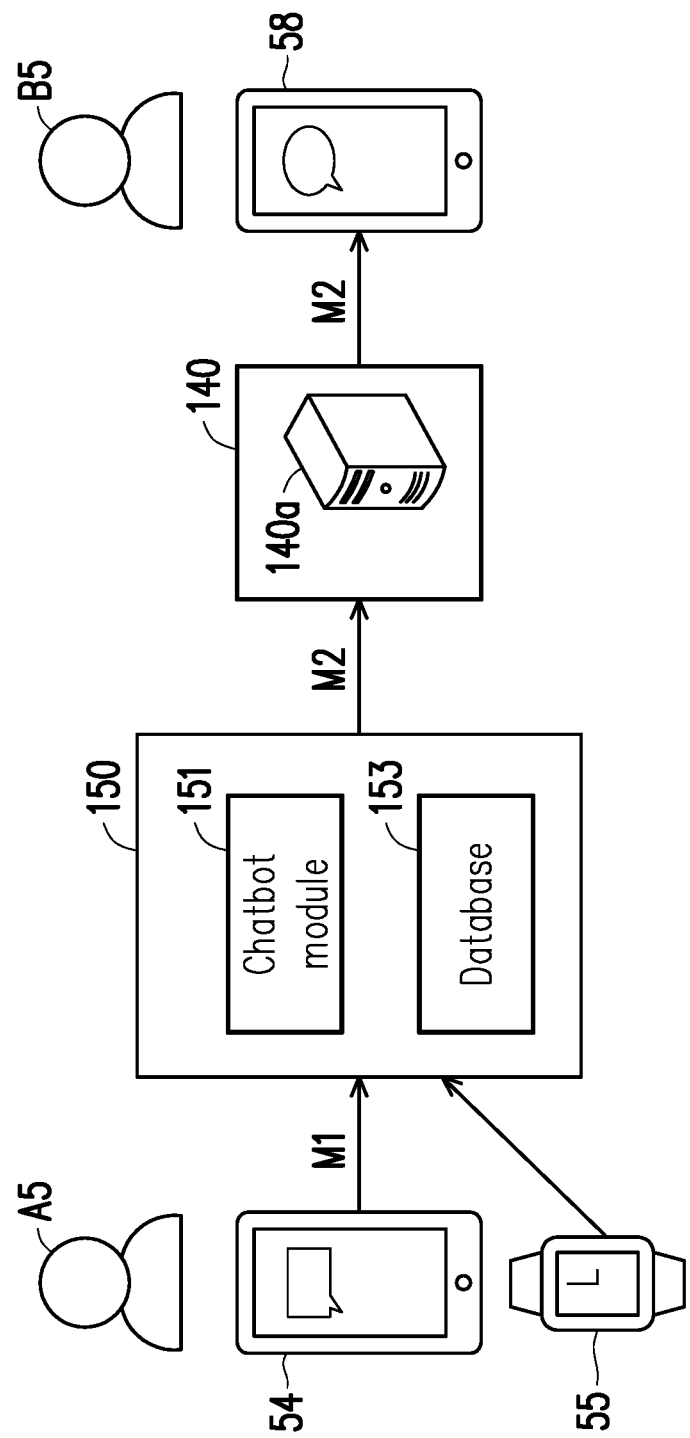

Referring to FIG. 5B, which is a schematic diagram of a cross-platform communication service illustrated according to an embodiment of the disclosure. When the first service providing platform 120 is provided by the server device 150, and the second service providing platform 140 is the instant communication platform, a user A5 using a specific application may communicate with a user B5 using an instant communication program. Here, since the first service providing platform 120 is provided by the server device 150, and the specific application used by the user A5 is a client of the first service providing platform 120, a first electronic device 54 or 55 that executes the specific application may directly guide the user message M1 to the server device 150. The first electronic device 55 is, for example, a smart watch. After the server device 150 acquires the user message Ml, an operation performed by the server device 150 is similar to the content of FIG. 5A, so that a second electronic device 58 displays the response message M2.

Figure 5C:
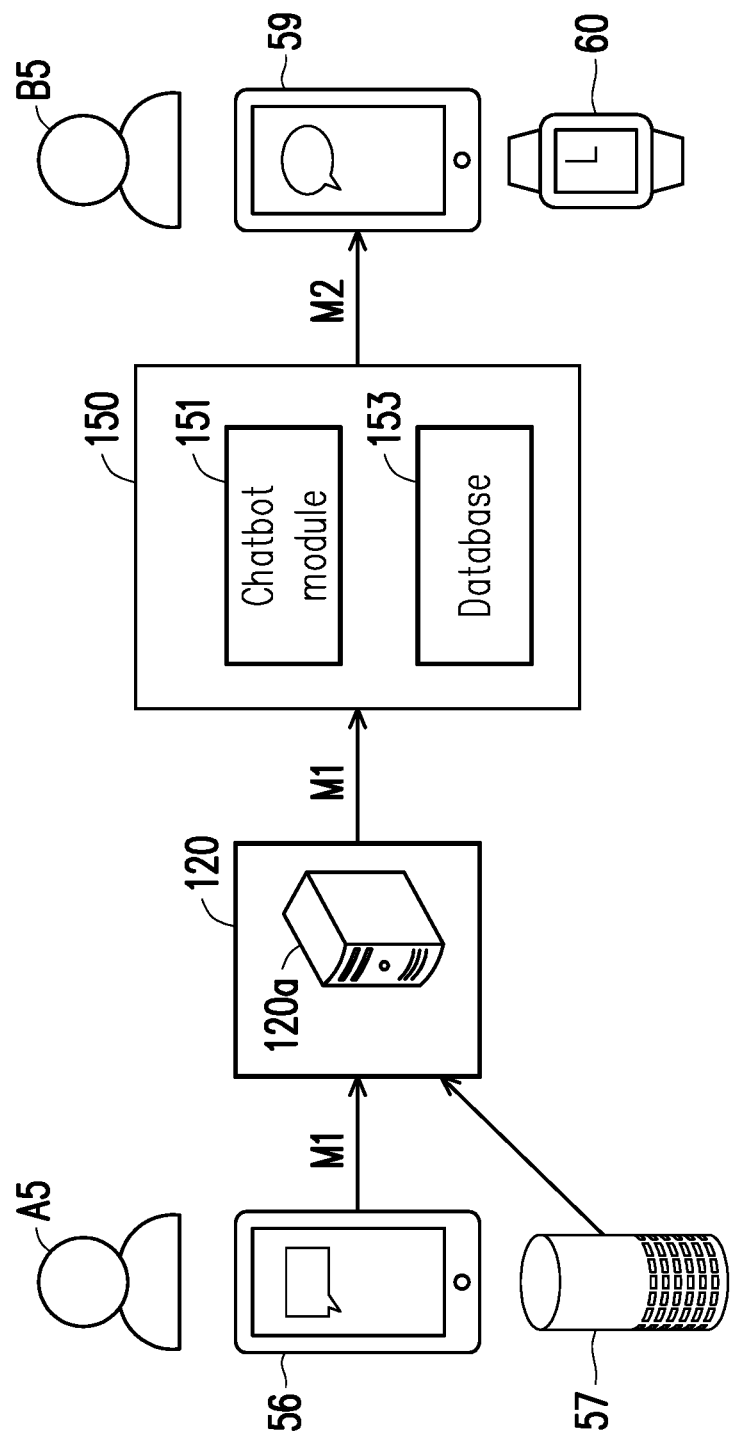

Referring to FIG. 5C, which is a schematic diagram of a cross-platform communication service illustrated according to an embodiment of the disclosure. When the second service providing platform 140 is provided by the server device 150, and the first service providing platform 120 is the instant communication platform, a user A5 using an instant communication program may communicate with a user B5 using a specific application. Here, the operation that the server device 150 receives the user message M1 through the third-party server 120a of the first service providing platform 120 is similar to that of FIG. 5A, so the server device 150 receives the user message M1 from a first electronic device 56 or 57. The first electronic device 57 is, for example, a smart speaker. A difference is that since the second service providing platform 140 is provided by the server device 150, and the specific application used by the user B5 is a client of the second service providing platform 140, a second electronic device 59 or 60 that executes the specific application may directly acquire the response message M2 from the server device 150. The second electronic device 60 is, for example, a smart watch.

Figure 6:
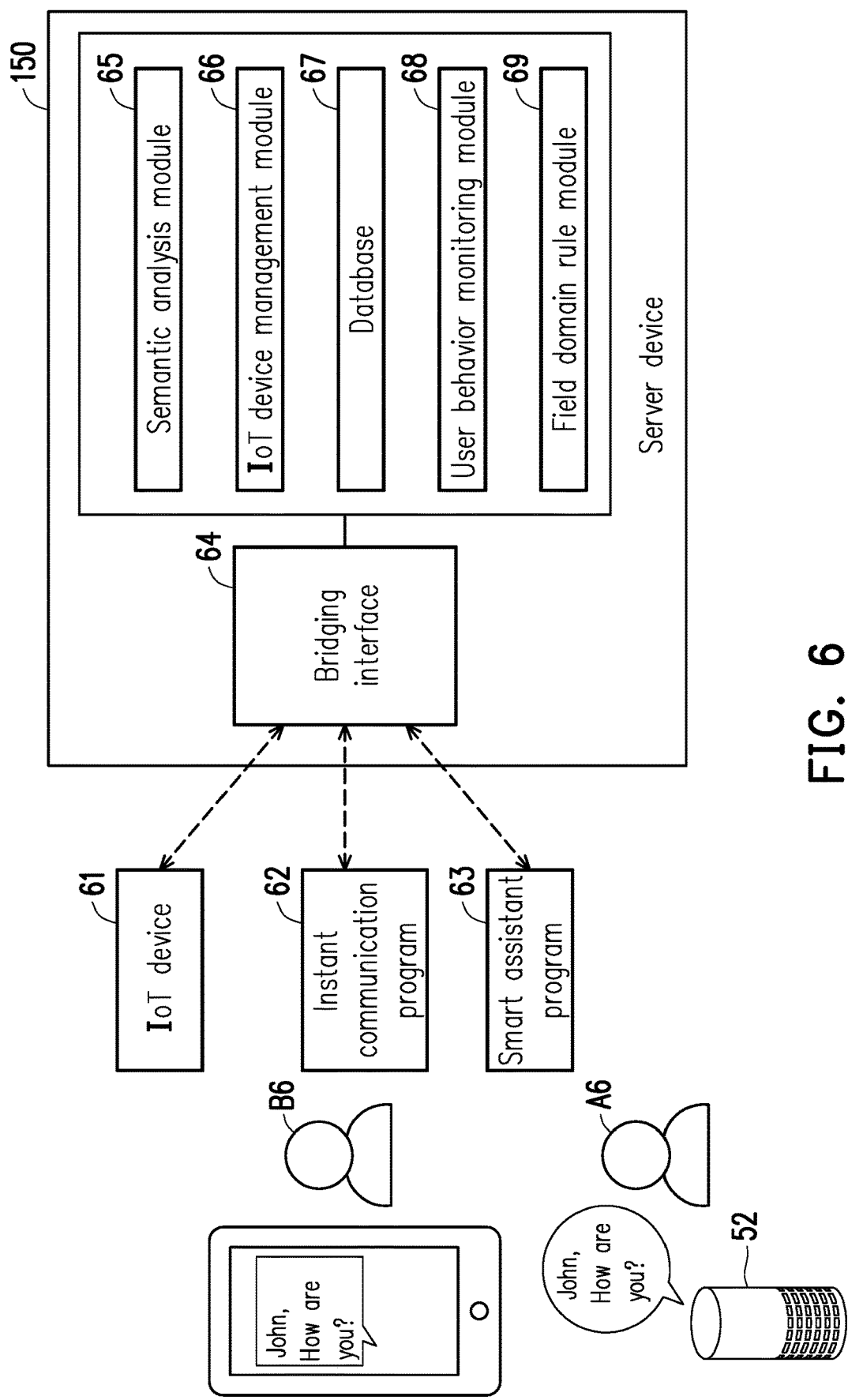
FIG. 6 is a functional block diagram of a server device illustrated according to an embodiment of the disclosure.

FIG. 6 is a functional block diagram of a server device illustrated according to an embodiment of the disclosure. Referring to FIG. 6, the server device 150 may include a bridging interface 64, a semantic analysis module 65, an Internet of Things (IoT) device management module 66, a database 67, a user behavior monitoring module 68 and a field domain rule module 69. The aforementioned interface, module and database may be implemented by the software element in the storage circuit 152 and the processor 151 of FIG. 3.

Referring to FIG. 6, the bridging interface 64 may be implemented through an Application Programming Interface (API). The bridging interface 64 may connect the server device 150 with different service providing platforms to exchange information with the IoT device 61, an instant communication program 62 and a smart assistant program 63. Specifically, the bridging interface 64 may include a module that provides a verification function, an authorization function and a conversion function. The bridging interface 64 may perform user identity verification through the verification function and determine whether a user is registered, and perform identity verification through the verification function with the first service providing platform and the second service providing platform. In addition, the bridging interface 64 may authorize a database access authority (for example, an access token is acquired through Auth authorization) of the user message M1 through the authorization function. In addition, the bridging interface 64 may convert an instruction or a message into a target format through the conversion function module in a retransmission process to facilitate exchange of messages. Based on this, the bridging interface 64 may transmit the user message from the IoT device 61, the instant communication program 62 and the smart assistant program 63 to the server device 150, and send the response message to the IoT device 61, the instant communication program 62 and the smart assistant program 63, so that the IoT device 61, the instant communication program 62 and the smart assistant program 63 may exchange messages. The semantic analysis module 65 performs semantic analysis on the user message M1 by using the natural language processing technology, so as to acquire the user intent and the associated keyword of the server device 150. The IoT device management module 66 is configured to manage the IoT device, and store IoT device interfaces and connection relationships among these IoT device interfaces, including a connection relationship of a cross-platform interface and various client device interfaces, so that the server device 150 calls the corresponding IoT device interface according to the user intent to control the IoT device or sends the response message through the IoT device interface to enable the IoT device to perform a corresponding function. The database records a large amount of contact information of users, including user accounts, contact lists, communication channel lists, and the like.

The user behavior monitoring module 68 and the field domain rule module 69 are configured to assist the semantic analysis module 65 to perform semantic analysis with a specific analysis logic. In detail, the user behavior monitoring module 68 may, for example, collect chatting content of a user and a chatbot and user information (such as the age of the user), and assist the semantic analysis module 65 to perform the semantic analysis according to the collected information. For example, the speaking wordings and the grammar logics of two users with very different ages are quite different. Therefore, the user behavior monitoring module 68 may monitor the chatting content of the user, so as to inform, according to a monitoring result, the semantic analysis module 65 to perform the semantic analysis with the specific analysis logic. In another aspect, the ways of speaking of two users in different field domains are also quite different. For example, the speaking wording of Hong Kong people is quite different from that of Taiwanese. Therefore, the field domain rule module 69 may inform, according to a field domain of the user, the semantic analysis module 65 to perform the semantic analysis with the specific analysis logic.

It is worth mentioning that in the embodiment of the disclosure, the server device 150 may perform message conversion processing on a user message according to contact information of a second electronic device to acquire a response message. Here, the message conversion processing includes voice-to-text conversion processing, text-to-voice conversion processing and voice-to-voice translation processing. That is, the server device 150 may perform the message conversion processing on message content, so as to generate message content that is more understandable for the user. For example, the server device 150 may perform the message conversion processing on the user message according to information such as a registration time zone or an open support language family of the second electronic device and then acquire the response message.

As shown in FIG. 6, a user A6 issues a user message "Send John a message with how are you" through the smart assistant program 63. The semantic analysis module 65 of the server device 150 may identify a user intent and a keyword of the user message under the assistance of the user behavior monitoring module 68 and the field domain rule module 69. In addition, the server device 150 may acquire a contact way and user information of a target user B6 from the database 67. The aforementioned user information is, for example, a language type (which may be obtained by the open support language family). In this example, the user A6 generates English message content, but the server device 150 may perform translation processing according to the user information of the target user B6. Therefore, the target user B6 may read a Chinese response message "John, how are you?" through the instant communication program 62.

Figure 7:
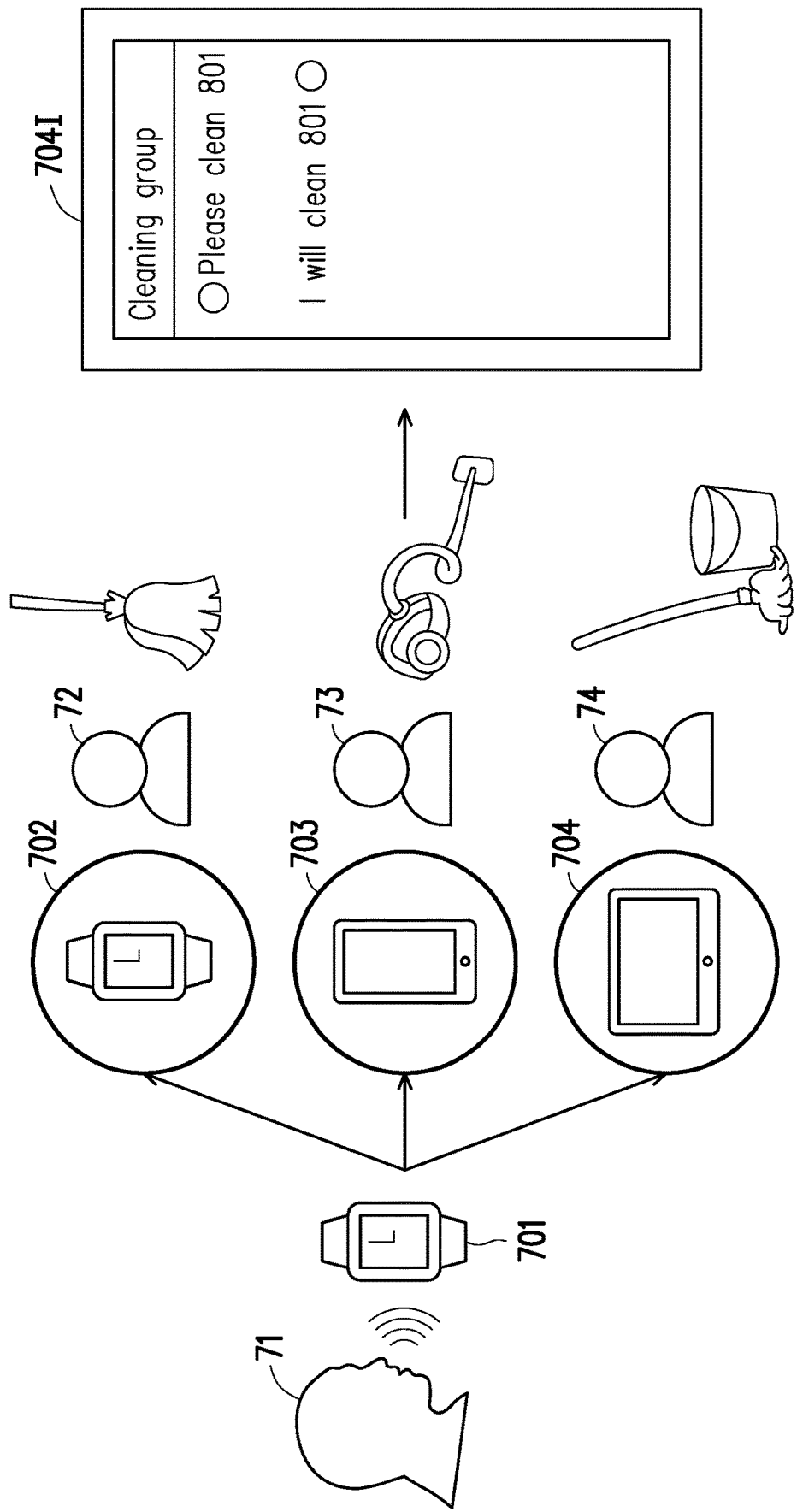
FIG. 7 is a schematic diagram of an application situation illustrated according to an embodiment of the disclosure.

FIG. 7 is a schematic diagram of an application situation illustrated according to an embodiment of the disclosure. Referring to FIG. 7, after users 71 to 74 are registered, chatbots may be respectively added into a friends list, and then a group may be created by using registration information of the users 71 to 74 and identification information corresponding to the chatbots. The user 71 may assign tasks to the users 72 to 74 through the cross-platform communication method. It should be noted that the users 71 to 72 may wear smart watches 701, 702 that execute a specific application, and the users 73 to 74 may respectively hold a mobile phone 703 and a tablet 704 which execute different instant communication programs. In this situation, the user 71 speaks a user message "Inform the cleaning group to clean 801" through the smart watch 701, and the smart watch 701 executes the specific application to transmit the user message to the back-end server device. The back-end server device may inquire contact information of the smart watch 702, the mobile phone 703 and the tablet 704 of the users 72 to 74 according to the user intent and the keyword of the user message. Then, the back-end server device may send a response message "Please clean 801" to the mobile phone 703 and the tablet 704 of the users 73 to 74 via a plurality of different instant communication platforms, or the back-end server device may directly guide the response message "Please clean 801" to the smart watch 702 of the user 72. As shown in FIG. 7, a user interface 7041 of the mobile phone 703 will display the response message "Please clean 801". Correspondingly, the user 74 may reply "Inform the cleaning group that I will clean 801" through the tablet 704 and the instant communication program. According to the same operation, the user interface 7041 of the mobile phone 703 will display the response message "I will clean 801".

Figure 8:
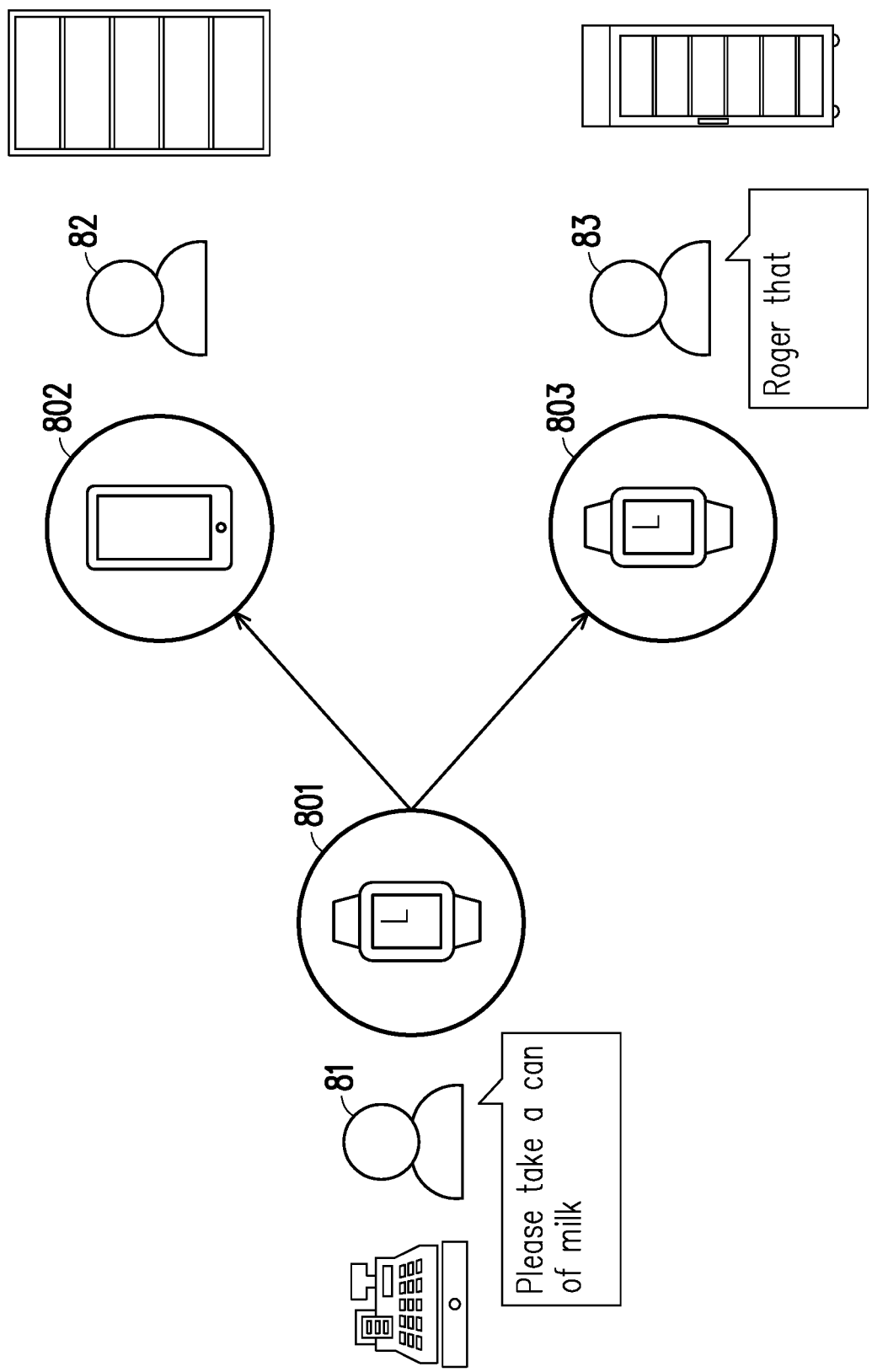
FIG. 8 is a schematic diagram of an application situation illustrated according to an embodiment of the disclosure.

FIG. 8 is a schematic diagram of an application situation illustrated according to an embodiment of the disclosure. Referring to FIG. 8, a user 81 may assign a task to users 82 to 83 through a cross-platform communication method. It should be noted that the users 81, 83 may wear smart watches 801, 803 that execute a specific application, and the user 82 may hold a mobile phone 802 that executes an instant communication program. In this situation, the user 81 speaks a user message "Please take a can of milk" to the smart watch 801, and the smart watch 801 executes the specific application to transmit the user message to the back-end server device. The back-end server device may inquire contact information of the mobile phone 802 and the smart watch 803 of the users 82 to 83 according to a user intent and a keyword of the user message. In addition, the back-end server device may further determine the user intent and the keyword according to the user message "Please take a can of milk". Then, the back-end server device may directly determine that the user 83 stands beside a milk freezer according to positions of the users 82, 83 (for example: prestored territory information of the users 82, 83, or positions generated by position sensors (not shown in the figures) of the mobile phone 802 and the smart watch 803), and send the user message "Please take a can of milk" to the smart watch 803 of the user 83. Later, a user interface of the smart watch 803 may display a response message of "Please take a can of milk".

Based on the above, in the embodiments of the disclosure, under the condition of not changing operation habits, users using different communication software can make message communication more flexible and convenient without installing or re-adapting to extra unfamiliar software. In addition, the embodiments of the disclosure may perform message conversion according to the user information to enable two users speaking different languages and using different instant communication software to communicate with each other effectively.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A cross-platform communication method, applicable to a communication system, the method comprising:
    receiving a user message from a first electronic device through a first service providing platform;
    identifying a user intent of the user message and a keyword associated with at least one second electronic device;
    inquiring contact information of the at least one second electronic device according to the keyword; and
    sending a response message associated with the user message to the at least one second electronic device according to the contact information and the user intent through at least one second service providing platform, so as to enable the at least one second electronic device to perform a function according to the response message, the cross-platform communication method further comprising:
    performing semantic analysis on the user message by using a natural language processing technology, so as to acquire the user intent and the keyword, and determining a specific analysis logic according to a user behavior, user information or a field domain of the user, so as to perform the semantic analysis with the specific analysis logic;
    collecting at least one chatting content of the user and the user information, and assisting in performing the semantic analysis according to the at least one chatting content and the user information; and
    performing the semantic analysis with the specific analysis logic according to the field domain of the user.

2. The cross-platfonii communication method according to claim 1, wherein the step of inquiring the contact information of the at least one second electronic device according to the keyword comprises:
    inquiring a contact list according to the keyword, so as to acquire a target user account of at least one target user; and
    inquiring a communication channel list of the at least one target user by using the target user account, so as to acquire the at least one second service providing platform and the contact information of the at least one target user on the second service providing platform, wherein the communication channel list comprises contact information of a plurality of communication interfaces of the target user.

3. The cross-platform communication method according to claim 1, wherein the function comprises providing the response message by a user interface of the at least one second service providing platform, and the response message comprises a text message, a picture message, a voice message or a video message;
    the method further comprising:
    performing message conversion processing on the user message of the first electronic device according to the contact information of the at least one second electronic device to acquire the response message, wherein the message conversion processing comprises voice-to-text conversion processing, text-to-voice conversion processing and voice-to-voice translation processing.

4. The cross-platform communication method according to claim 1, wherein the first service providing platform and the at least one second service providing platform are different instant communication platforms.

5. The cross-platform communication method according to claim 1, wherein the first service providing platfonn is a voice assistant platform, and the at least one second service providing platform is an instant communication platform.

6. The cross-platform communication method according to claim 1, wherein one of the first service providing platform and the at least one second service providing platform is provided by a server device in the communication system, and the other one of the first service providing platform and the at least one second service providing platform is an instant communication platform.

7. The cross-platform communication method according to claim 2, further comprising:
    in response to receiving a registration request of a user, establishing the contact list of the user and the communication channel list of the user; and
    in response to the absence of the communication channel list of the target user account, providing the response message to the at least one second electronic device by a short message or an e-mail via the target user account.

8. The cross-platform communication method according to claim 2, further comprising:
    establishing a chatbot for the first service providing platfonn or the at least one second service providing platform, so as to receive the user message or send the response message through the chatbot.

9. A server device, comprising:
    a communication interface, connected to a first service providing platform and at least one second service providing platform via a network;
    a storage circuit, recording a plurality of modules; and
    a processor, coupled to the storage circuit and configured to access the modules to: receive a user message from a first electronic device through the first service providing platform, identify a user intent of the user message and a keyword associated with at least one second electronic device, inquire contact information of the at least one second electronic device according to the keyword, and send a response message associated with the user message to the at least one second electronic device according to the contact information and the user intent through the at least one second service providing platform, so as to enable the at least one second electronic device to perform a function according to the response message, wherein the server device comprises a semantic analysis module, a user behavior monitoring module, and a field domain rule module, the semantic analysis module performs semantic analysis on the user message by using a natural language processing technology, so as to acquire the user intent and the keyword, and determines a specific analysis logic according to a user behavior, user information or a field domain of the user, so as to perform the semantic analysis with the specific analysis logic, the user behavior monitoring module collects at least one chatting content of the user and the user information, and assisting the semantic analysis module to perform the semantic analysis according to the at least one chatting content and the user information; and the field domain rule module informs, according to the field domain of the user, the semantic analysis module to perform the semantic analysis with the specific analysis logic.

10. The server device according to claim 9, wherein the processor is configured to:
inquire a contact list according to the keyword, so as to acquire a target user account of a target user; and
inquire a communication channel list of the target user by using the target user account, so as to acquire the at least one second service providing platform and the contact information of the target user on the at least one second service providing platform, wherein the communication channel list comprises contact information of a plurality of communication interfaces of the target user.

11. The server device according to claim 9, wherein the function comprises providing the response message by a user interface of the at least one second service providing platform, and the response message comprises a text message, a picture message, a voice message or a video message;
wherein the processor is configured to:
perform message conversion processing on the user message according to the contact information of the at least one second electronic device to acquire the response message, wherein the message conversion processing comprises voice-to-text conversion processing, text-to-voice conversion processing and voice-to-voice translation processing.

12. The server device according to claim 9, wherein the first service providing platform and the at least one second service providing platform are different instant communication platforms.

13. The server device according to claim 9, wherein the first service providing platform is a voice assistant platform, and the at least one second service providing platform is an instant communication platform.

14. The server device according to claim 9, wherein one of the first service providing platform and the at least one second service providing platform is provided by the server device, and the other one of the first service providing platform and the at least one second service providing platform is an instant communication platform.

15. The server device according to claim 10, wherein the processor is configured to:
in response to receiving a registration request of a user, establish the contact list of the user and the communication channel list of the user; and
in response to the absence of the communication channel list of the target user account, provide the response message to the at least one second electronic device by a short message or an e-mail via the target user account.

16. The server device according to claim 10, wherein the processor is configured to:
establish a chatbot for the first service providing platform or the at least one second service providing platform, so as to receive the user message or send the response message through the chatbot.

17. An electronic device, comprising:
a memory; and
a processor, coupled to the memory, and configured to:
access a contact list of a user and a communication channel list of the user;
provide the contact list of the user and the communication channel list of the user to a server device; and
send a user message through a chatting interface of a first service providing platform or receive a response message through a chatting interface of a second service providing platform, wherein the chatting interface comprises a chatbot operated by the server device,
wherein the server device performs semantic analysis on the user message by using a natura e nrocessin technolo y, so as to acquire the user intent and the keyword, and determines a specific analysis logic according to a user behavior, user infoiniation or a field domain of the user, so as to perform the semantic analysis with the specific analysis logic,
the server device collects at least one chatting content of the user with the chatbot and the user information, and assists in performing the semantic analysis according to the at least one chatting content and the user information; and
the server device performs the semantic analysis with the specific analysis logic according to the field domain of the user.

18. The electronic device according to claim 17, wherein the processor is further configured to:
in response to sending a registration request of the user to the server device, provide user information to the server device, wherein the user information comprises a registration time zone and an open support language family of an operating system of the electronic device.

* * * * *